(12) United States Patent
Zhu et al.

(10) Patent No.: US 11,504,730 B2
(45) Date of Patent: Nov. 22, 2022

(54) METHOD FOR CALCULATING INSTANTANEOUS SPRINKLER STRENGTH

(71) Applicant: Jiangsu University, Jiangsu (CN)

(72) Inventors: Xingye Zhu, Jiangsu (CN); Junping Liu, Jiangsu (CN); Shouqi Yuan, Jiangsu (CN); Kun Tian, Jiangsu (CN); Jinghong Wan, Jiangsu (CN)

(73) Assignee: Jiangsu University, Jiangsu (CN)

( * ) Notice: Subject to any disclaimer, the term of this patent is extended or adjusted under 35 U.S.C. 154(b) by 807 days.

(21) Appl. No.: 16/344,690

(22) PCT Filed: Nov. 22, 2016

(86) PCT No.: PCT/CN2016/106706
§ 371 (c)(1),
(2) Date: Apr. 24, 2019

(87) PCT Pub. No.: WO2018/082129
PCT Pub. Date: May 11, 2018

(65) Prior Publication Data
US 2020/0047205 A1 Feb. 13, 2020

(30) Foreign Application Priority Data
Nov. 1, 2016 (CN) .......................... 201610940904.1

(51) Int. Cl.
*B05B 12/00* (2018.01)
*A01G 25/09* (2006.01)
*G01W 1/14* (2006.01)

(52) U.S. Cl.
CPC ............ *B05B 12/004* (2013.01); *A01G 25/09* (2013.01); *G01W 1/14* (2013.01)

(58) Field of Classification Search
CPC ........ B05B 12/004; A01G 25/09; G01W 1/14
(Continued)

(56) References Cited

U.S. PATENT DOCUMENTS

| | | | | |
|---|---|---|---|---|
| 8,285,421 B2* | 10/2012 | Vander Griend | ...... | A01G 25/16 703/6 |
| 8,311,786 B2* | 11/2012 | Kisch | ...................... | G06F 30/20 703/6 |

(Continued)

FOREIGN PATENT DOCUMENTS

| | | |
|---|---|---|
| CN | 101226107 A | 7/2008 |
| CN | 105160096 A | 12/2015 |
| SU | 1644818 A1 | 4/1991 |

OTHER PUBLICATIONS

Carrion et al., "SIRIAS: a simulation model for sprinkler irrigation", May 2001, Irrig Sci. pp. 73-84. (Year: 2001).*

(Continued)

*Primary Examiner* — Ricky Go
(74) *Attorney, Agent, or Firm* — Greenberg Traurig, LLP

(57) ABSTRACT

Disclosed is a method for calculating instantaneous sprinkler strength comprising: ensuring that a translational sprinkler (1) maintains a stable operating state, placing b rain barrels (3) at a distance of a metres from the translational sprinkler (1), and moving the translational sprinkler (1) to obtain measurement data; calculating movement time, and the average sprayed water depth received by the rain barrels (3); assuming the distribution form of the amount of water of the translational sprinkler (1), establishing a function relationship between an instantaneous sprinkler strength ht and the movement time t, and calculating a variable in the function relationship; and substituting into the established function relationship a specific numerical value of an instantaneous point in time t of the movement of the translational sprinkler (1), so that the value of ht obtained is a numerical value of the instantaneous sprinkler strength of the translational sprinkler (1). The calculation method has a simple operation, is fast and can obtain a precise calculation result with relatively low experiment costs.

6 Claims, 2 Drawing Sheets

(58) Field of Classification Search
USPC .......................................................... 702/55
See application file for complete search history.

(56) References Cited

U.S. PATENT DOCUMENTS

| 10,058,879 B2* | 8/2018 | Needham | ............ F16K 31/0655 |
| 2019/0104696 A1* | 4/2019 | Fischman | ............ A01G 25/092 |

OTHER PUBLICATIONS

Ge et al., "Application of different curve interpolation and fitting methods in water distribution calculation of mobile sprinkler machine", Aug. 2018, Elsevier Ltd., pp. 316-328. (Year: 2018).*
Li et al., "Development and validation of a modified model to simulate the sprinkler water distribution", Dec. 2014, Elsevier Ltd., pp. 38-47. (Year: 2014).*
Jing-Hong Wan et al., "Translocating Speed Ration Effect on Water Distribution Uniformity of Lightweight Lateral Move Irrigation System", Water Saving Irrigation, pp. 87-93, Sep. 2016.
Li, Jinchang, "Method for Calculating Irrigation Intensity of Clockwise Irrigation Machine", Irrigation Technology, No. 2, Dec. 31, 1984, ISSN: 1001-4780, pp. 25-30. (See International Search Report for PCT/CN2016/106706 for relevance).
Hartmann, H., "The Measurement of Instantaneous Irrigation Intensity of Rotating Sprinkler", Irrigation and Drainage, 12(1), Dec. 31, 1993, ISSN: 1000-646X, pp. 49-51. (See International Search Report for PCT/CN2016/106706 for relevance).
International Search Report for PCT/CN2016/106706, dated Jul. 28, 2017, three pages.

\* cited by examiner

METHOD FOR CALCULATING INSTANTANEOUS SPRINKLER STRENGTH

Cross Reference to Related Application

The present application is a 371 U.S. National Stage of International Application No. PCT/CN2016/106706, filed Nov. 22, 2016, which claims the benefit of the earlier filing date of Chinese Patent Application No. 201610940904.1 filed on Nov. 1, 2016, which are each incorporated herein by reference in their entirety.

I. TECHNICAL FIELD

The present invention relates to a method for calculating performance parameters of a translational sprinkler in the technical field of agricultural irrigation, particularly to a method for calculating instantaneous sprinkling intensity.

II. BACKGROUND ART

A translational sprinkler is a kind of typical sprinkling irrigation equipment, and is widely applied in agricultural water-saving irrigation in China. The movement speed of a translational sprinkler has a direct influence on the volume of sprinkled water in unit area; specifically, the lower the movement speed is, the greater the volume of sprinkled water in unit area is; in contrast, the higher the movement speed is, the smaller the volume of sprinkled water in unit area is. Therefore, the movement speed control strategy of a translational sprinkler is key to ensure effective operation of the translational sprinkler.

When a translational sprinkler is applied to irrigation of farmland, the relationship between instantaneous sprinkling intensity of the translational sprinkler and soil infiltration capacity of farmland is a key factor in determining whether runoff is generated. At present, there is no effective method for calculating instantaneous sprinkling intensity of a translational sprinkler yet. Consequently, if surface runoff occurs when a translational sprinkler is applied to irrigation of farmland in some special circumstances, it is impossible to directly analyze whether the surface runoff is caused by mismatch between soil infiltration capacity of farmland and instantaneous sprinkling intensity of translational sprinkler unit, so that it is impossible to specifically solve such research problems. Therefore, it is of great theoretical and practical significance to develop a method for calculating instantaneous sprinkling intensity.

III. CONTENTS OF THE INVENTION

The technical problem to be solved by the present invention is to provide a method for calculating instantaneous sprinkling intensity, in order to overcome the lack of understanding and mastery of the relationship between soil infiltration capacity of farmland and instantaneous sprinkling intensity of translational sprinkler when studying the problem of the movement speed control strategy of the translational sprinkler, and to specifically solve such problems.

To attain the above-mentioned object, the present invention provides a method for calculating instantaneous sprinkling intensity, which comprises the following steps:

(a) placing rain gauges in number of b with water-receiving opening in diameter D at a distance of a meters from a translational sprinkler, to measure the volume of water sprinkled from the translational sprinkler;

(b) setting an operating pressure of the translational sprinkler, maintaining the translational sprinkler in a stable operating state, setting a movement speed s of the translational sprinkler, moving the translational sprinkler till the rain gauges cannot receive water sprinkled from the translational sprinkler, and then stopping the translational sprinkler; measuring the volume of sprinkled water $c_i$ (i=1, . . . , b) received in each rain gauge, repeating the test for n times at the same movement speed, and calculating the average volume of sprinkled water $d_i = c_i/n$ (i=1, . . . , b) received in each rain gauge;

(c) calculating the movement time t=2R/s during which the volume of water sprinkled from the translational sprinkler is received in the rain gauges; calculating the average volume of sprinkled water $V = \sum_{i=1}^{b} d_i / b$ received in the rain gauges; calculating the average depth $V = \sum_{i=1}^{b} d_i / b$ of sprinkled water received in the rain gauges;

(d) assuming a distribution shape of the volume of water sprinkled from the translational sprinkler, and establishing a functional relationship $h_t = kf(t)$ between instantaneous sprinkling intensity $h_t$ and the movement time t according to the mathematical characteristics of the assumed shape, where, k is a general term of all variables in the analytic expression f(t), and f(t) is an analytic expression of the independent variable t; calculating the variable k in the functional relationship $h_t = kf(t)$ from the value of the movement time t and the value of the average depth H of sprinkled water which are calculated in the step (c), according to the mathematical characteristics of the assumed shape; and (e) substituting the specific numerical value of instantaneous movement time t of the translational sprinkler into the functional relationship $h_t = kf(t)$ established in the step (d) to obtain the value of $h_t$, which is the numerical value of the instantaneous sprinkling intensity of the translational sprinkler.

Furthermore, the assumed distribution shape of the volume of water sprinkled from the translational sprinkler (1) is an elliptical shape, a triangular shape, or a parabolic shape.

Furthermore, the volume of sprinkled water $c_i$ (i=1, . . . , b) received in each rain gauge (3) is measured after the translational sprinkler (1) operates stably for 10 min.

Furthermore, the distance of a meters between the rain gauge (3) and the translational sprinkler (1) is greater than the sprinkling range R of a sprayer on the translational sprinkler (1).

Furthermore, the number b of the rain gauges is greater than or equal to 1.

Furthermore, the number n of repetition times of the test is greater than or equal to 1.

The method for calculating instantaneous sprinkling intensity provided in the present invention is simple and quick to operate, and can obtain an accurate calculation result at a lower experiment cost, thereby providing a direction and basis for subsequent study on optimization of the movement speed of a translational sprinkler.

IV. DESCRIPTION OF DRAWINGS

In the FIGURE:
1. translational sprinkler; 2—sprayer; 3—rain gauges

V. EMBODIMENTS

Hereunder the present invention will be further detailed with reference to the drawings and embodiments, but the protection scope of the present invention is not limited thereto.

Figure 1:
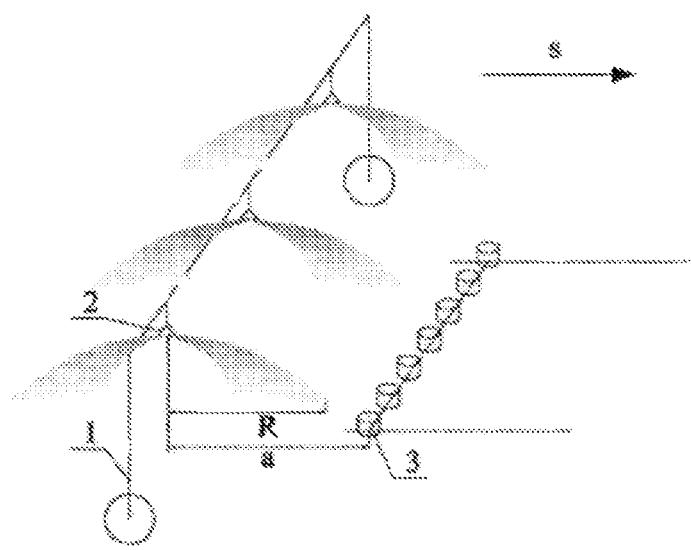
FIG. 1 is a schematic diagram in which the rain gauges are receiving sprinkled water from a translational sprinkler according to the present invention.

As shown in FIG. 1, first, a translational sprinkler 1 is selected as an experimental prototype. The sprinkling range R of the sprayers 2 on the translational sprinkler 1 is 3.5 m, the number b of rain gauges with water-receiving opening in diameter D (0.2 m in this embodiment) arranged at a distance a (4 m in this embodiment) from the translational sprinkler 1 to measure the volume of water sprinkled from the translational sprinkler 1 is 9. The operating pressure of the sprayers 2 on the translational sprinkler 1 is set to 70 kPa, and the sprayers 2 are maintained in a stable operating state. The translational sprinkler 1 is moved and test data is collected after the sprayers 2 operate stably for 20 min.

The movement speed s of the translational sprinkler 1 is set to 2.5 m/min., and the translational sprinkler 1 is moved till the rain gauges 3 cannot receive the volume of water $c_i$ (i=1, . . . , 6) sprinkled from the translational sprinkler 1, and then the translational sprinkler 1 is stopped. The volume of sprinkled water received in each rain gauge 3 is measured, the test is repeated for n times (3 times in this embodiment) at the same movement speed, and the average volume of sprinkled water $d_i=c_i/n$ (i=1, . . . , b) received in each rain gauge is calculated, as shown in Table 1.

TABLE 1

| Average Volume of Sprinkled Water Received in Each Rain Gauge | | | | | | | | | | |
|---|---|---|---|---|---|---|---|---|---|---|
| | | Rain Gauge No. | | | | | | | | |
| | | 1 | 2 | 3 | 4 | 5 | 6 | 7 | 8 | 9 |
| Volume | $1^{st}$ time | 62 | 58 | 50 | 42 | 66 | 53 | 63 | 52 | 58 |
| of | $2^{nd}$ time | 85 | 55 | 72 | 44 | 70 | 44 | 51 | 68 | 72 |
| Sprinkled | $3^{rd}$ time | 76 | 72 | 80 | 57 | 64 | 70 | 78 | 74 | 66 |
| Water, mL | Average value | 74.3 | 61.7 | 67.3 | 47.7 | 66.7 | 55.7 | 64.0 | 64.7 | 65.3 |

The movement time during which the volume of water sprinkled from the translational sprinkler 1 is received in the rain gauge 3 is calculated as follows:

$t=2R/s=2\times 3.5/2.5=2.8$ min.

The average volume of sprinkled water received in the rain gauges is calculated as follows:

$V=\Sigma_{i=1}^{6} d_i/b = (74.3+61.7+67.3+47.7+66.7+55.7+64.0+64.7+65.3)1/9=63.0$ mL.

The average depth of sprinkled water received in each rain gauge is calculated as follows:

$H=4V/\pi D^2 = 4\times 63.0/(3.14\times (0.2\times 100)^2)=0.20$ mm.

The distribution shape of the volume of water sprinkled from the translational sprinkler 1 is assumed as an elliptical shape, a functional relationship $$\frac{h_t^2}{m^2} + \frac{(t-1.4)^2}{n^2} = 1$$

between instantaneous sprinkling intensity $h_t$ and movement time t is established according to the mathematical characteristics of the assumed shape, where, the mathematical meaning of m is the longitudinal semi-axis of the assumed ellipse and the physical meaning thereof is the maximum instantaneous sprinkling intensity, the mathematical meaning of n is the transverse semi-axis of the assumed ellipse and the physical meaning thereof is half of the total movement time.

According to the calculated time t=2.8 min., it is ascertained that n in the functional relationship is 1.4 min.; according to the average depth of sprinkled water H=0.2 mm obtained through calculation, the area of the upper half of the ellipse in the functional relationship is H=½πmn, i.e., 0.2=½×3.14×m×1.4; then, it can be calculated: m=0.091 mm/min=5.46 mm/h. Thus, the functional equation of the ellipse is $$\frac{h_t^2}{29.81} + \frac{(t-1.4)^2}{1.96} = 1.$$

Next, the specific numerical values of instantaneous movement time t of the translational sprinkler, for example t=1 min, 1.5 min, and 2 min, are substituted into the established functional relationship $$\frac{h_t^2}{29.81} + \frac{(t-1.4)^2}{1.96} = 1,$$

to obtain the values of instantaneous sprinkling intensity $h_t$ of the translational sprinkler 1, which are 5.23 mm/h, 5.45 mm/h, and 4.93 mm/h respectively.

Figure 2:
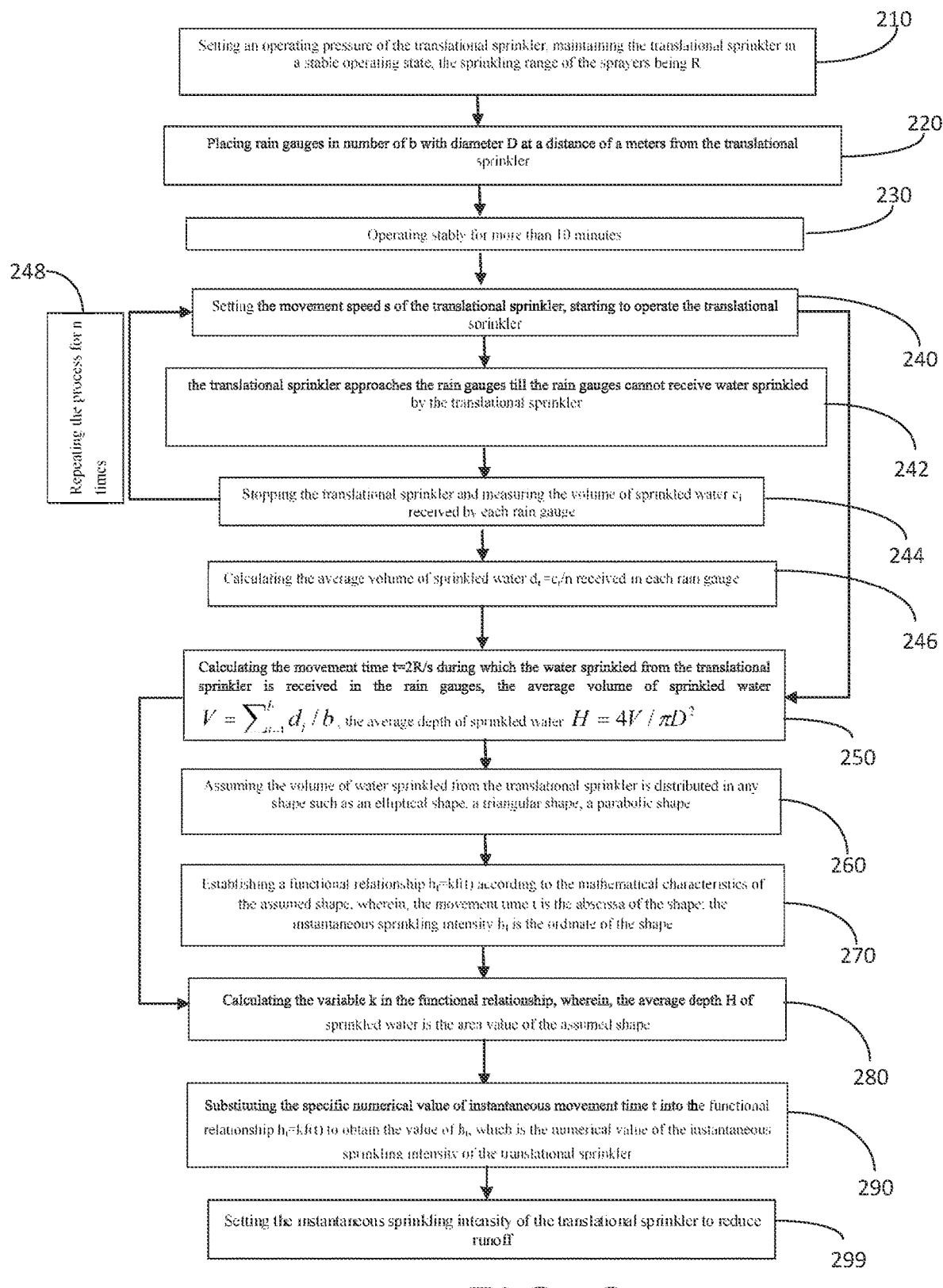
Fig. 2 is a flow chart illustrating a method of determining instantaneous sprinkling intensity, according to an exemplary embodiment.

FIG. 2 is a flow chart illustrating a method 200 of determining instantaneous sprinkling intensity, according to an exemplary embodiment. As shown in FIG. 2, at 210, an operating pressure of the translational sprinkler is set, a stable operating state is maintained, and the sprinkling range of the sprayers is set to R. At 220, rain gauges in number of b with diameter D are placed at a distance of a meters from the translational sprinkler. At 230, the sprinklers operate stably for more than 10 minutes. At 240, the movement speed of the translational sprinkler is set to s, and the translational sprinkler starts to operate. At 242, the translational sprinkler approaches the rain gauges until the rain gauges cannot receive water sprinkled by the translational sprinkler. At 244, the translational sprinkler is stopped, and a volume of sprinkled water $c_i$ received by the translational sprinkler is measured. At 248, steps 240-244 may be repeated. At 246, the average volume of sprinkled water $d_i$ is calculated for each rain gauge. At 250, the movement time t during which the water sprinkled from the translational sprinkler is received in the rain gauges is calculated, as well as the average volume and average depth of sprinkled water. At 260, an assumption is made that the volume of water is distributed in any shape such as an elliptical shape, a triangular shape, and a parabolic shape. At 270, a functional relationship $h_t$ is established according to the mathematical characteristics of the assumed shape, with movement time t as the abscissa of the shape and the instantaneous sprinkling intensity $h_t$ is the ordinate of the shape. At 280, the variable k in the functional relationship is calculated, where the average depth H is the area value of the assumed shape. At 290, the specific numerical value of instantaneous movement time t is substituted into the functional relationship to obtain the value of ht, which is the numerical value of the instantaneous sprinkling intensity of the translational sprinkler. At 299, the instantaneous sprinkling intensity of the translational sprinkler is set to reduce runoff of soil.

Although the embodiment described above is a preferred embodiment of the present invention, the present invention is not limited to the above embodiment. Any obvious improvement, replacement, or variation that can be made by the person skilled in the art without departing from the spirit of the present invention shall be deemed as falling in the protection scope of the present invention.

We claim:

1. A method for calculating instantaneous sprinkling intensity, comprising the following steps:
   (a) placing a number of b rain gauges with water-receiving opening in a diameter D at a distance of a meters from a translational sprinkler, to measure a volume of water sprinkled from the translational sprinkler;
   (b) setting an operating pressure of the translational sprinkler, maintaining the translational sprinkler in a stable operating state, setting a movement speed s of the translational sprinkler, moving the translational sprinkler until the rain gauges cannot receive water sprinkled from the translational sprinkler, and then stopping the translational sprinkler; measuring the volume of sprinkled water $c_i$ (i=1, ..., b) received in each rain gauge, repeating a test for n times at the same movement speed, and calculating an average volume of sprinkled water $d_i=c_i/n$ (i=1, ..., b) received in each rain gauge,
   wherein the test comprises the setting the operating pressure, the maintaining the stable operating state, the setting the movement speed s, the moving the translational sprinkler until the rain gauges cannot receive water sprinkled from the translational sprinkler, and the stopping the translational sprinkler;
   (c) calculating a movement time t=2R/s during which the volume of water sprinkled from the translational sprinkler is received in the rain gauges as a function of sprinkling rate R of a sprayer on the translational sprinkler; calculating an average volume of sprinkled water $$V = \sum_{i=1}^{b} \frac{d_i}{b}$$

received in the rain gauges; calculating an average depth $H=(4V)/(\Pi D^2)$ of sprinkled water received in the rain gauges;
   (d) assuming a distribution shape of the volume of water sprinkled from the translational sprinkler, and establishing a functional relationship $h_t=kf(t)$ between instantaneous sprinkling intensity $h_t$ and the movement time t according to mathematical characteristics of the assumed shape, where, k is a general term of all variables in the analytic expression f(t), and f(t) is an analytic expression of the independent variable t; calculating the variable k in the functional relationship $h_t=kf(t)$ from the value of the movement time t and the value of the average depth H of sprinkled water which are calculated in the step (c), according to the mathematical characteristics of the assumed shape;
   (e) substituting the specific numerical value of instantaneous movement time t of the translational sprinkler into the functional relationship $h_t=kf(t)$ established in the step (d) to obtain the value of $h_t$, which is the numerical value of the instantaneous sprinkling intensity of the translational sprinkler; and
   (f) setting the instantaneous sprinkling intensity of the translational sprinkler to reduce runoff of soil.

2. The method for calculating instantaneous sprinkling intensity according to claim 1, wherein the assumed distribution shape of the volume of water sprinkled from the translational sprinkler is an elliptical shape, a triangular shape, or a parabolic shape.

3. The method for calculating instantaneous sprinkling intensity according to claim 1 or 2, wherein the volume of sprinkled water $c_i$ (i=1, ..., b) received in each rain gauge is measured after the translational sprinkler operates stably for 10 min.

4. The method for calculating instantaneous sprinkling intensity according to claim 1, wherein the distance of a meters between the rain gauge and the translational sprinkler is greater than the sprinkling range R of a sprayer on the translational sprinkler.

5. The method for calculating instantaneous sprinkling intensity according to claim 1, wherein the number b of the rain gauges is greater than or equal to 1.

6. The method for calculating instantaneous sprinkling intensity according to claim 1, wherein the number n of repetition times of the test is greater than or equal to 1.

* * * * *